No. 894,539. PATENTED JULY 28, 1908.
E. SCHILDHAUER & A. A. RADTKE.
REGULATION FOR MULTIPHASE SYSTEMS.
APPLICATION FILED FEB. 8, 1907.
3 SHEETS—SHEET 2.
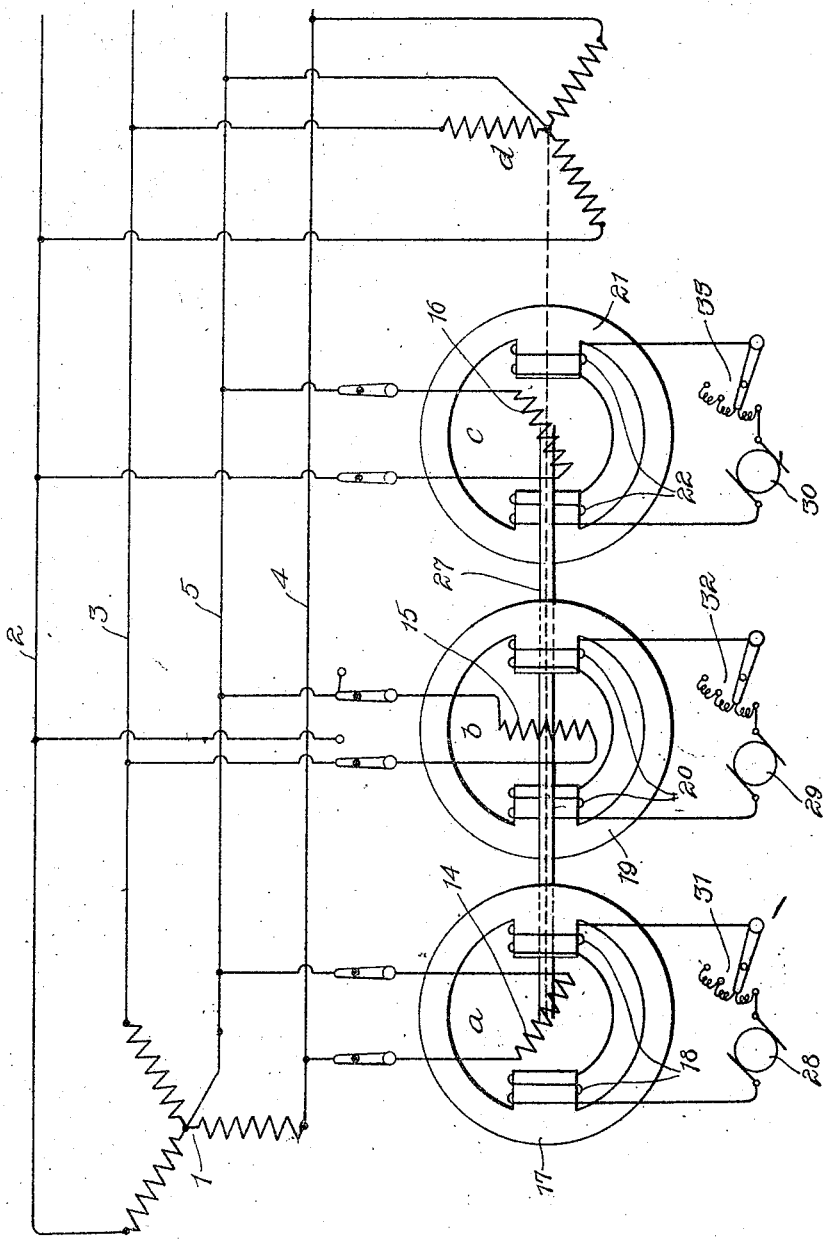
Witnesses:
Arthur H. Boettcher,
George C. Higham.
Inventors
Albert A. Radtke
Edward Schildhauer
By Charles A. Brown
Attorney.

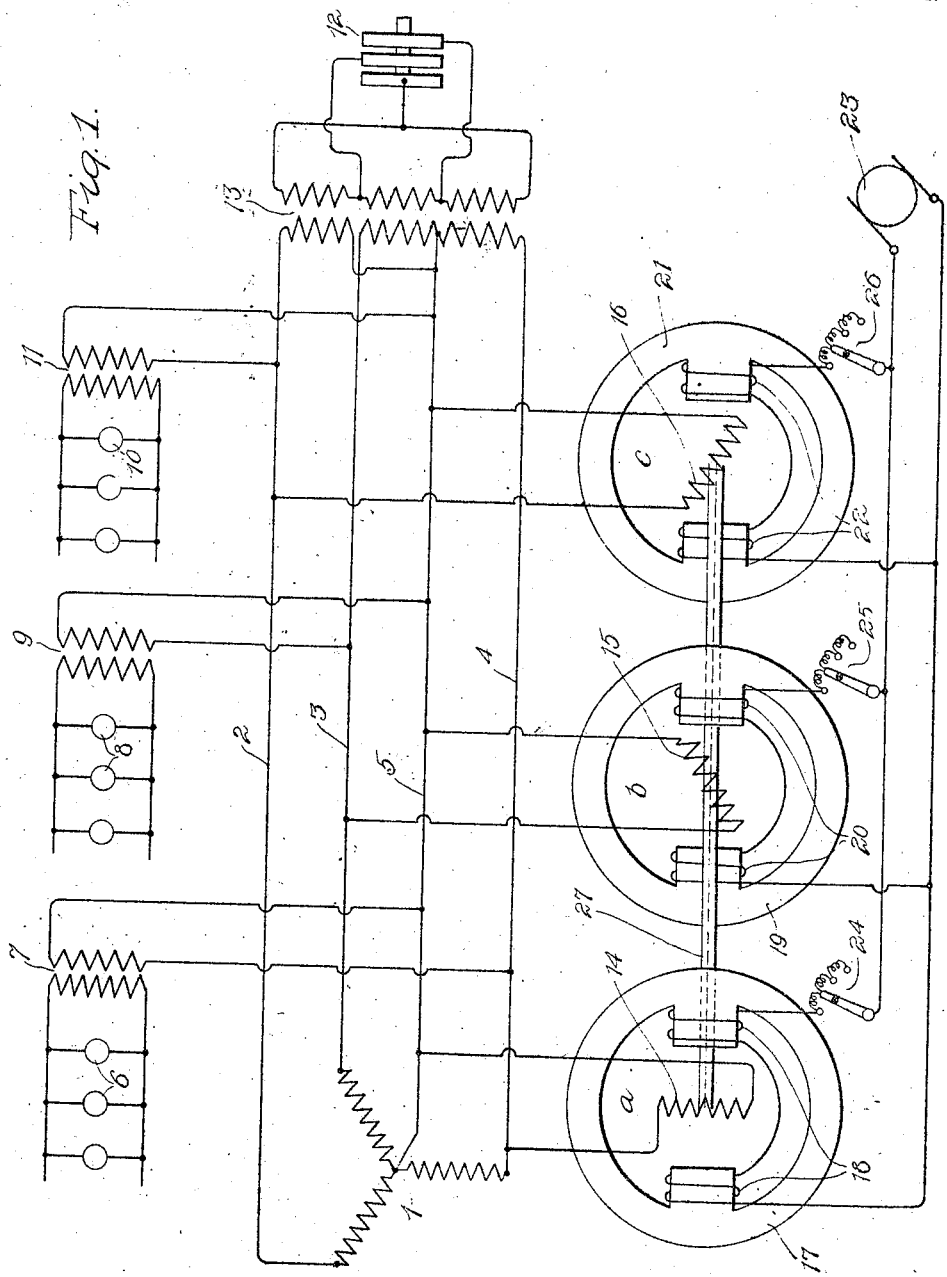

No. 894,539. PATENTED JULY 28, 1908.
E. SCHILDHAUER & A. A. RADTKE.
REGULATION FOR MULTIPHASE SYSTEMS.
APPLICATION FILED FEB. 8, 1907.
3 SHEETS—SHEET 3.
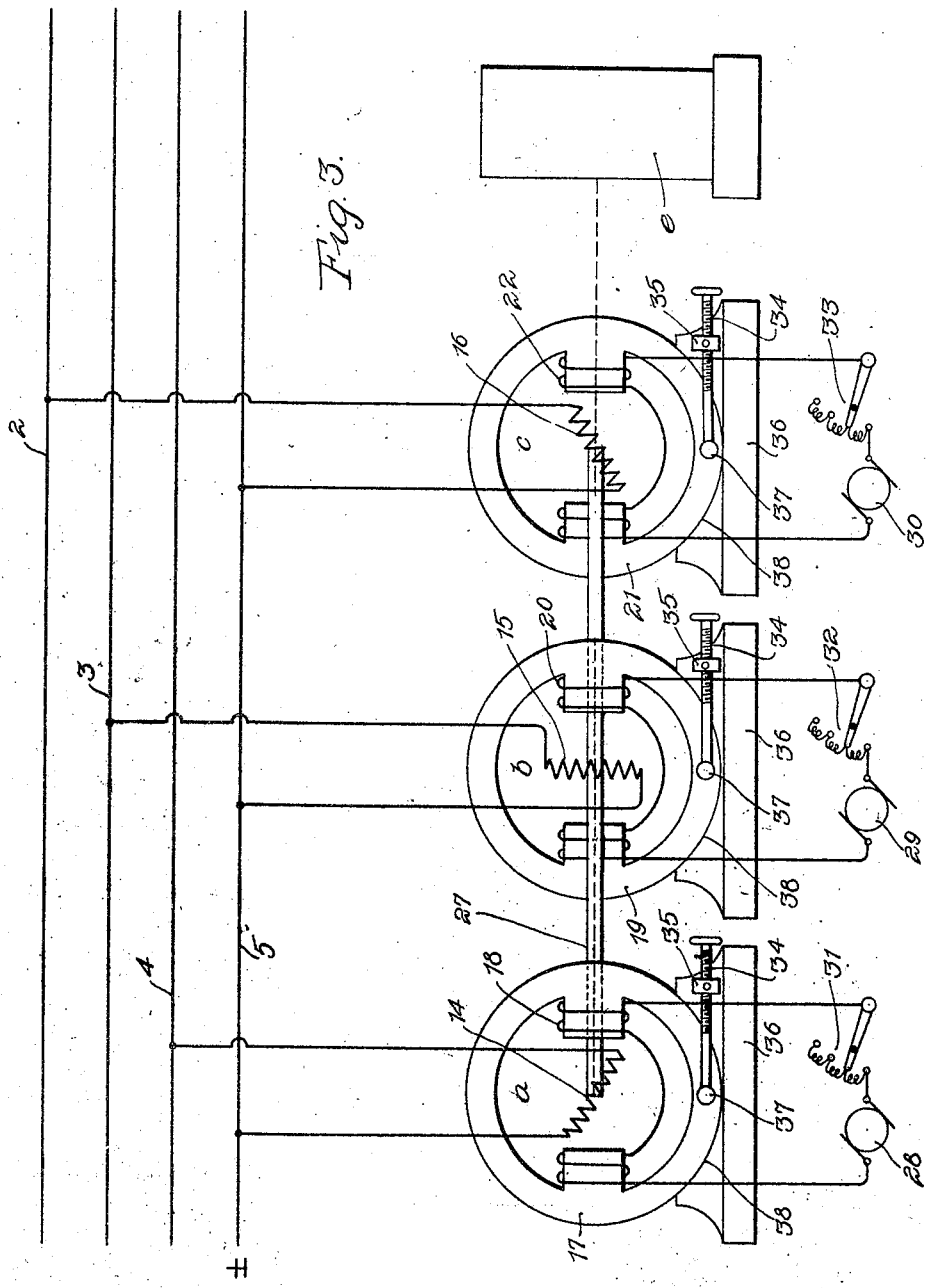
Witnesses:
Arthur H. Boettcher,
George E. Higham.
Inventors
Albert A. Radtke
Edward Schildhauer
By Charles A. Brauer
Attorney.

UNITED STATES PATENT OFFICE.

EDWARD SCHILDHAUER, OF WASHINGTON, DISTRICT OF COLUMBIA, AND ALBERT A. RADTKE, OF CHICAGO, ILLINOIS.

REGULATION FOR MULTIPHASE SYSTEMS.

No. 894,539.  Specification of Letters Patent.  Patented July 28, 1908.

Application filed February 8, 1907. Serial No. 356,428.

*To all whom it may concern:*

Be it known that we, EDWARD SCHILDHAUER and ALBERT A. RADTKE, citizens of the United States, residing, respectively, at Washington, District of Columbia, and at Chicago, in the county of Cook and State of Illinois, have invented a certain new and useful Improvement in Regulation for Multiphase Systems, of which the following is a full, clear, concise, and exact description, reference being had to the accompanying drawings, forming a part of this specification.

Our invention relates to systems of regulation for multi-phase systems, its object being to provide regulating mechanism and improved arrangement thereof for regulating the various circuits of a multi-phase alternating current system.

It is customary at the present date to generate alternating current at the central station at a low frequency, it being found that rotary converters operate most successfully at this frequency. Lamps and other translating devices, however, do not operate well at this low frequency, and 60 cycles is a customary figure for their operation and hence the use of motor generators to convert 25 cycles to 60 cycles. In the business districts of large cities, it is also customary to use direct current for which rotary converters are used to convert alternating current to direct current at usually 110 volts. The transmission lines carry the current at a low frequency to the substations where the motor generators are situated to convert it to 60 cycles for the residence districts, but where these motor generators are employed, complicated switch and controlling mechanism is necessary.

It is, therefore, the main purpose of our invention to provide a system of control and regulation which requires less and simpler apparatus, consequently eliminating the greater part of the switchboard and associated controlling mechanism. Again our controlling system is automatic in its operation whereas in the motor generator systems more or less manual attendance and labor is necessary. By eliminating the motor generators which require a low frequency for efficient operation, the central station machinery can supply 60 cycles directly to the transformer substations, and it is evident that great saving results.

We are aware of multi-phase controlling systems in which synchronous motors are connected to the various branches or phases, which synchronous motors are so excited as to produce either leading or lagging current in the phase branches, thereby offering a means for increasing the power factor. These systems are adaptable as far as they go, but they do not go far enough in that complete regulation cannot be accomplished. In our system we also employ synchronous machinery which may be connected in various ways with the line circuits, these synchronous units, however, being joined together so that they will mutually and automatically assist each other in maintaining perfect conditions of operation. Take for example, in a three-phase system a synchronous machine is connected with each phase circuit, but the armatures of these machines are all mounted on a common shaft and their mechanical displacement is 120 degrees. In other words, instead of having a three-phase armature connected with the three phases of the circuit, this armature is split into three parts displaced 120 degrees from each other but mounted on the same shaft, each armature part being connected across one of the phase limbs. The excitation of the fields for the machines may be accomplished from individual sources or from a common source and may be controlled individually or in common. With this arrangement the pressure is equally or otherwise proportionately distributed and maintained on the circuits.

The drawings which accompany this specification show various arrangements which might be used.

Figure 1 illustrates the arrangement just referred to; Fig. 2 illustrates a second modification, and Fig. 3, another modified arrangement.

In Fig. 1, 1 represents a central station three-phase generator from which extend the main conductors 2, 3 and 4 and a neutral conductor 5. The load or translating devices 6 are shown as supplied from the transformer 7 connected with the phase or branch 4, 5; the translating devices 8 are fed from transformer 9 connected with the branch 3, 5; the translating devices 10 are shown as fed from conductor 11 connected with the branch 2, 5, while the three-phase motor 12 is fed from the transformer 13 connected with all the conductors. Synchronous machine *a* has the armature 14 connected with the phase branch 4, 5; the synchronous machine b has the armature 15 connected with the phase branch 3, 5, and the synchronous machine c has the armature 16 connected with the phase branch 2, 5. The field core 17 for machine a has the field windings 18; the field core 19 for machine b has the field windings 20, and the field core 21 for machine c has the field windings 22. As shown in this figure a common source 23 of direct current supplies the field windings of the machines, there being an adjustable resistance 24 provided in the field branch at machine a; an adjustable resistance 25 for machine b and an adjustable resistance 26 for machine c. The various field windings, however, could be supplied from individual sources, if desired, and a common adjustable resistance could also be provided for the three field windings. The armatures 14, 15 and 16 really represent the phase sections of a three phase armature displaced 120 degrees and are all mounted on a common shaft represented by the axial line 27. If one of the phase branches, for instance, phase branch 4, 5 should become overloaded, machine a will tend to lag, but the armature thereof being secured to the common shaft 27, the machine will be driven as a generator and thus will compensate for the overload. In other words, machines b and c will act to assume part of the load on branch 4, 5, and will tend to keep the system balanced. If the load on branch 4, 5, for instance, should become sufficiently diminished, machine a will then assist machines b and c. The adjustable resistances for the machines allow of various regulation adjustments, and when an adjustment is once established, the machines will tend to maintain a corresponding line or service condition.

In Fig. 2 is shown an arrangement in which the synchronous machines a, b and c are connected with the line the same as in Fig. 1, but in addition a three-phase synchronous or induction motor d is shown connected with the line conductors, the armature of this motor being also secured to the common shaft 27. Each of the machines a, b and c has an individual field exciting source 28, 29 and 30, respectively, and adjustable resistances 31, 32 and 33 respectively in the field circuits. The various machines attached to the common shaft effect each other mutually to maintain equalization and regulation on the line.

In Fig. 3 are also shown the machines a, b and c and a prime mover e which is connected to the common shaft 27, and this prime mover e may be an electrical machine or a steam engine, gas engine, or the like. Each of the machines is provided with the same exciting circuit adjustments, but in addition provision is made for mechanically adjusting the field cores of the machines with respect to the armatures. This is illustrated diagrammatically, a screw 34 passing through a lug 35 extending from the motor bed 36 and pivoted at its end to the field core at 37, the core being set in the cylindrical pocket 38. Upon turning of the screw 34 the field core may be given angular rotation in either direction, thus affording additional means for controlling the regulation of the system by these machines. Any other arrangement also could be utilized besides those shown, the main feature being interconnection of the motors so that they will mutually assist each other in maintaining regulation of the line and efficiency of service.

Having thus described our invention, we claim as new and desire to secure by Letters Patent:

1. In an alternating current multiphase system, the combination of a main generator, the phase branches of the transmission line leading from the generator, and dynamo electric machines connected with the branches with the armatures thereof mounted on a common shaft whereby each machine may be operated either as a motor or a generator.

2. In an alternating current multiphase transmission system, the combination with the main generator and the phase branches leading therefrom, of a synchronous machine connected with each branch, the armatures of the machines being mounted on a common shaft whereby each machine may operate either as a motor or a generator.

3. In an alternating current three-phase transmission system, the combination with the main generator and the phase branches leading therefrom, of a synchronous machine associated with each branch with its armature connected to the conductors thereof, the armatures of the machine being mounted on a common shaft and having a displacement of 120 degrees with respect to each other, said machines operating either as motors or generators and coöperating to maintain an equal load in each of the phase branches.

4. In a multiphase alternating current transmission system, the combination with the main generator and the phase branches leading therefrom, of dynamo electric machines connected with the branches and having their rotating parts mechanically connected whereby they may operate either as motors or generators, the armatures of the dynamo electric machines being electrically displaced.

5. In an alternating current multiphase transmission system, the combination with the main generator and the phase branches leading therefrom, of a plurality of synchronous machines connected with the phase branches and having their armatures mechanically connected together so that the machines may operate either as motors or generators to coöperate to maintain equal load on the phase branches, and mechanical means associated with the field frames of the machines for adjusting their electrical angle with respect to the armatures.

6. A polyphase generator, translating devices connected to the different phases of the system operated in connection with said generator, means for maintaining an equal load on each phase of said generator when the translating devices require unequal energy, consisting of a plurality of dynamo electric machines connected to the phases of the system for supplying additional current thereto and having their armatures mechanically connected together so that the machine on the phase which carries a light load will operate as a motor to drive the other machines which act as dynamos, and means for regulating the field strength of said dynamo electric machines.

7. A polyphase generator, translating devices connected to the different phases of the system operated in connection with said generator, dynamo electric machines separate and distinct from the generator and connected to the phases of the system for supplying additional current thereto, and means for connecting the armatures of said electric machines together so that the machine which is connected to the phase of the generator that carries a light load will operate as a motor to drive the other electric machines which act as dynamos to supply additional current to the system.

In witness whereof, we hereunto subscribe our names.

EDWARD SCHILDHAUER.
Jan. 30th, 1907.
ALBERT A. RADTKE.
Feb. 6, 1907.

Witnesses for Schildhauer:
WM. M. BEALL,
E. McC. JONES.

Witnesses for Radtke:
CHARLES J. SCHMIDT,
HARVEY L. HANSON.